United States Patent
Frick

[11] Patent Number: 6,072,562
[45] Date of Patent: Jun. 6, 2000

[54] APPARATUS FOR PRODUCING PHOTOGRAPHIC PRINTS

[75] Inventor: Beat Frick, Buchs, Switzerland

[73] Assignee: Gretag Imaging AG, Regensdorf, Switzerland

[21] Appl. No.: 09/150,725

[22] Filed: Sep. 10, 1998

[30] Foreign Application Priority Data

Sep. 12, 1997 [EP] European Pat. Off. ............. 97115930

[51] Int. Cl.⁷ ........................... G03B 27/42; G03B 27/52
[52] U.S. Cl. .................................. 355/55; 355/53; 355/63
[58] Field of Search ................................. 355/40, 44, 55, 355/56, 29, 18, 50, 52, 63, 75, 77, 133, 53.1, 53.2, 53.26, 53.5

[56] References Cited

U.S. PATENT DOCUMENTS

| | | | |
|---|---|---|---|
| 4,837,602 | 6/1989 | Tahara | 355/29 |
| 4,866,477 | 9/1989 | Barry et al. | 355/55 |
| 5,502,540 | 3/1996 | Miyawaki et al. | 355/22 |
| 5,594,525 | 1/1997 | Benker et al. | 355/29 |
| 5,786,909 | 7/1998 | Miyawaki et al. | 358/527 |

FOREIGN PATENT DOCUMENTS

| | | |
|---|---|---|
| 195 18 337 | 11/1995 | Germany . |
| 59-100428 | 6/1984 | Japan . |

OTHER PUBLICATIONS

EPO Search Report, Mar. 1998.

*Primary Examiner*—Alan A. Mathews
*Assistant Examiner*—Rodney Fuller
*Attorney, Agent, or Firm*—Burns, Doane, Swecker & Mathis, LLP

[57] ABSTRACT

A printing apparatus is disclosed which includes an original positioning device (3) for transporting an original (F) to and positioning it in a printing position, a printing material positioning device (2a) for transporting the photographic printing material (P) to and positioning it in an exposure position, a lighting device (4) for exposing the original, located in the printing position, to print light, an adjustable lens (5) for projecting the original, located in the printing position, onto the printing material located in the exposure position with an variable enlargement, a lens focusing device (6) for varying the enlargement of the lens (5), and a control device (10) for the original positioning device (3), the printing material positioning device (2a) and the lens focusing device (6). In order to produce arbitrary enlargements of sections, the lens (5) is disposed so as to be adjustable substantially crosswise to the transport direction (L) of the original (F), by means of a lens positioning device (12) that cooperates with the control device (10). In order to define a section to be copied from the original and to define a desired enlargement, a control device (13, 14) cooperating with the control device (10) is provided. The control device (10), on the basis of the detail and enlargement defined by the control device, controls the original positioning device (3), the lens positioning device (12), and the lens focusing device (6).

13 Claims, 6 Drawing Sheets

APPARATUS FOR PRODUCING PHOTOGRAPHIC PRINTS

FIELD OF THE INVENTION

The invention relates to an apparatus for producing photographic prints from an original onto a photographic printing material and more particularly, to an apparatus for producing enlargement of sections of originals.

BACKGROUND OF THE INVENTION

Apparatuses for producing photographic prints from an original are well known. They typically include an original positioning device for transporting the original to and positioning it in a printing position and a printing material positioning device for transporting the photographic printing material. In these types of printing equipment, the entire original, typically an image on a strip of film, is projected onto the printing material and printed. The original is disposed in the printing position on a stage for originals in such a way that its center is located in the optical axis of the projection lens.

Printing apparatus for producing enlargements of sections of originals are also known. With existing systems, it is typically necessary to position the original in such a way that the center of the section that is to be copied from the original is located in the optical axis of the projection lens. These printing apparatuses are equipped with special stages for originals that allow suitable positioning of the original in two dimensions.

In present systems, however, the enlargement and production of arbitrary sections of an original requires special stages for originals. What is desired, therefore, is an improved apparatus which simplifies the production of enlargement sections.

SUMMARY OF THE INVENTION

The present invention simplifies the production of enlargements of sections. In particular, a generic printing apparatus is modified to facilitate the production of arbitrary section enlargements without the use of special stages for the originals.

Due to the crosswise adjustability of the projection lens according to the present invention, the original need not be positioned in two directions. The original only has to be positioned in the travel direction of the originals in such a way that the section to be copied is located in the printing position. This can be accomplished with the existing transport means which is used for transporting the originals. Instead of positioning the original in the direction crosswise to the travel direction, the projection lens is adjusted so that the desired detail of the original is copied again centrally onto the printing material. Hence, no special stage for originals with two degrees of freedom in positioning is required.

According to a preferred embodiment of the present invention, a control device is provided by which the section of the original that is to be printed and the desired enlargement can be defined easily by the user. A screen or display is provided on which the original and the section defined by manual input means is shown. Input signals are furnished to the control device in accordance with the defined section and the defined enlargement, and the control device automatically positions the original and the lens and also sets the enlargement for the lens.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE INVENTION

Figure 1:
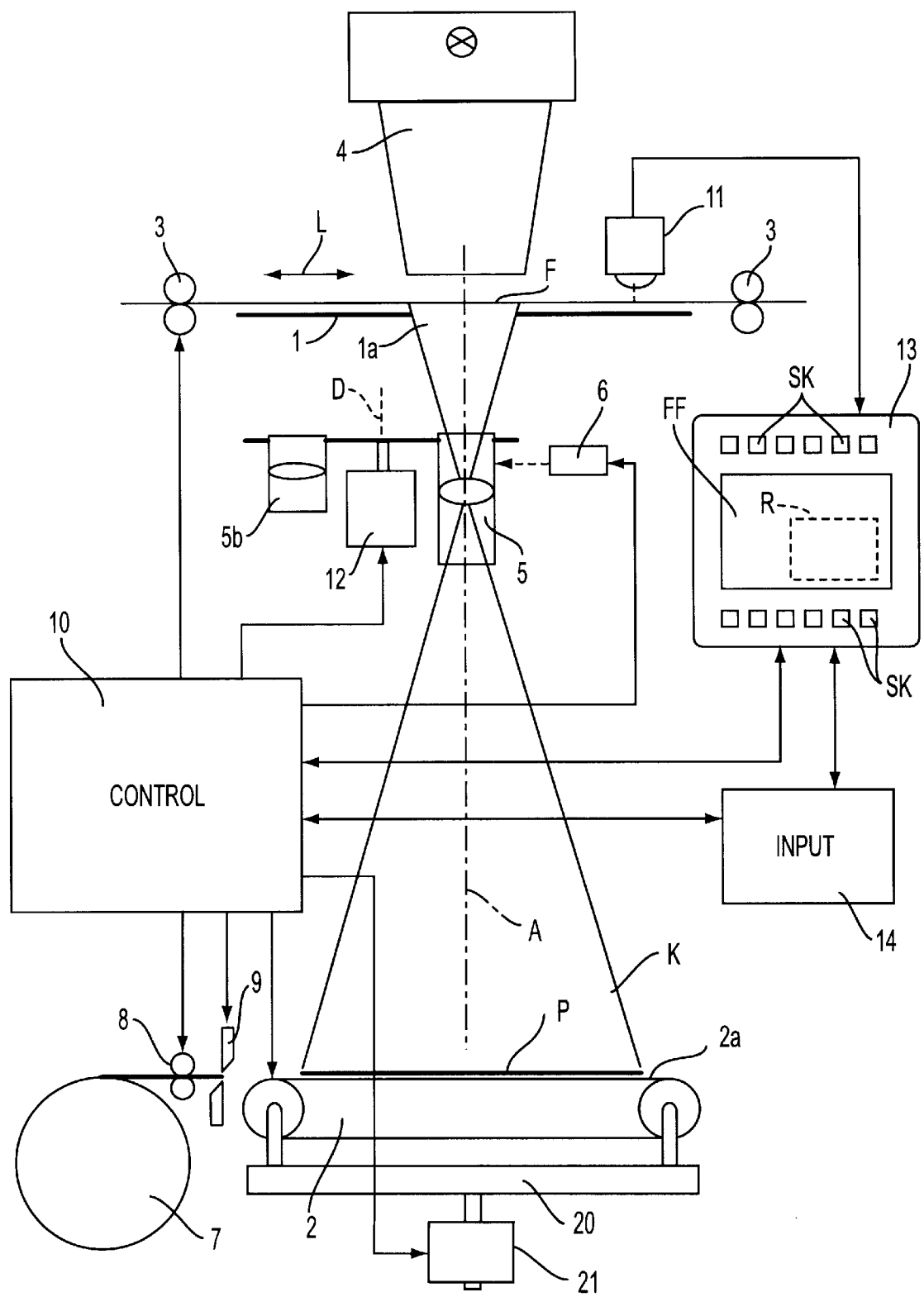
FIG. 1 illustrates a photographic printing apparatus according to the present invention.

In the figures, only those components of the printing apparatus needed for facilitating the understanding of the invention are illustrated. These components, found in many conventional photographic printers, include: a stage for originals 1 having a printing window 1a; a paper stage 2 with a motor-driven conveyor belt 2a; motor-driven transport rollers 3 for an original F; an exposure device 4 for the original placed on the stage 1; a projection lens 5 with variable enlargement, i.e., a zoom lens, mounted on a lens turret 12; a lens focusing device 6, i.e., a zoom drive; a supply roll 7 for printing material P; motor-driven transport rollers 8 for feeding the printing material P from the supply roll 7 to the paper stage 2; a cutting device 9 for cutting or severing individual sheets of printing material; and a control device 10 for controlling the transport rollers 3 and 8, the lens focusing device 6, the cutting device 9, and the conveyor belt 2a of the paper stage 2. Three additional zoom lenses are also mounted on the lens turret (12) but only one of them, designated 5b is illustrated. The printing beam path is designated as K.

Other exemplary embodiments of the present invention comprise additional components which will be discussed in further detail below. These components are: a scanner 11 for photoelectric scanning of the images of the original F, a lens positioning device such as the lens turret 12 for adjusting or positioning the projection lens 5 crosswise, i.e., perpendicular to the plane of the drawing, to the transport direction L of the original F and a lighting device, cooperating with the control device 10, for defining both the section to be copied of the original F and the desired enlargement. The lighting device itself includes a screen or display 13 for displaying the image of the scanned original and an input means 14 in the form of a keyboard and/or a pointer device such as a mouse or a trackball. The scanner 11, screen 13, input means 14, and lens positioning device 12 are controlled by the control device 10.

The transport rollers 3 form an original positioning device for transporting the original F to and positioning it in a printing position. The conveyor belt 2a forms a printing material positioning device for transporting the printing material to and positioning it in an exposure position.

To produce a normal, i.e., a full-image, print of an original F, the film strip, on which the original to be copied is located, is moved by the transport rollers 3 in the longitudinal direction L of the film strip until the original F is located in the printing position in the print window 1a. The center of the original F is located in the optical axis A of the projection lens 5. A piece of printing material P of a suitable length for the desired print format is drawn off from the supply roll 7 by the transport rollers 8 and cut or severed by the cutting device 9. This piece is placed on the paper stage 2 and transported by means of the conveyor belt 2a to the exposure position. In this position, the center of the sheet P of printing material is located in the optical axis A of the projection lens 5. The projection lens 5 is also focused to the appropriate enlargement by means of the lens focusing device 6. This focusing is also associated with an adjustment of the lens in the direction of the optical axis A. Finally, in a known manner, the printing material P is exposed. All of these operations are controlled by the control device 10. To this extent, the mode of operation of the printing apparatus according to the invention is equivalent to the prior art requires no further description to one skilled in the art.

The production of enlargements of sections, however, proceeds differently in the printing apparatus of the present invention. The control device according to exemplary embodiments of the invention allows the user to define the section of the original that is to be copied as well as the desired enlargement in a simple manner.

The normal position of the projection lens 5 will be understood hereinafter to mean the position of the lens 5 in which the optical axis A of the lens passes through the center of the printing window 1a. The position of the original F in which its center is located in the optical axis A of the lens 5, when the lens is in its normal position, will be called the normal printing position. The exposure position is the position of the printing material on the paper stage 2 in which the center of the sheet P of printing material is located in the optical axis A of the lens 5 when the lens is in its normal position.

Figure 2:
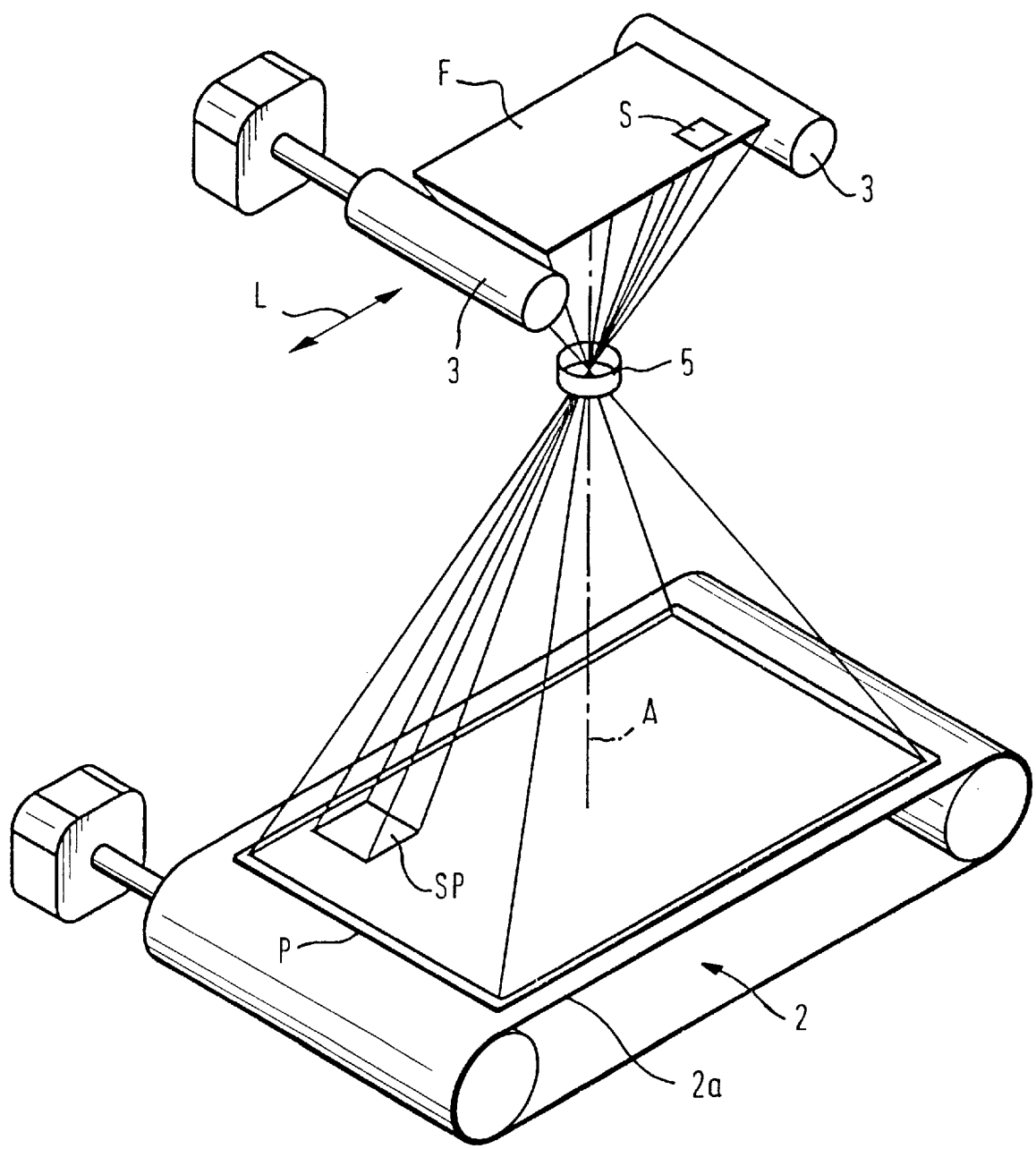
FIGS. 2–5 illustrate the functional sequences of the apparatus according to the present invention.
Figure 3:
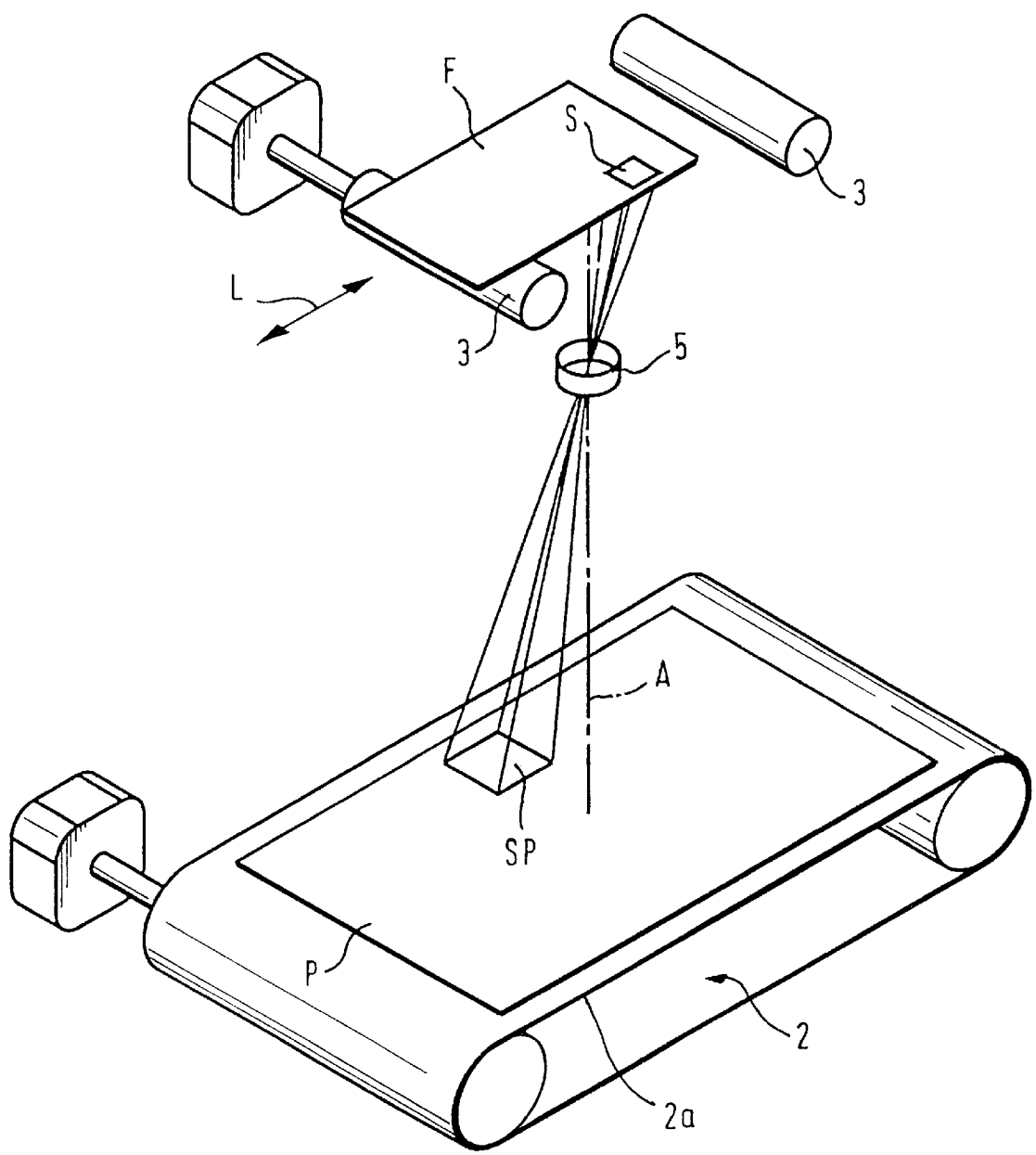

When the original is transported into the printing window 1a of the stage 1, the original F is passed below the scanner 11 and scanned photoelectrically in accordance with the image. This can be performed in black and white or preferably, in color. The scanning signals thus produced are utilized, after suitable processing, to display the original F on the screen or screen 13. The projected view of the original F on the screen 13 are designated as FF in FIG. 1. The control device 10 creates a frame R on the screen which designates the section of the original that is to be copied. The size and position of the frame R can be adjusted by the user using the input means 14. Naturally, some other optical marking of the section may be provided instead of the frame R. The defined print format and therefore, indirectly the defined enlargement, are also shown on the screen. The printing format can also be selected through the input means 14. The control device 10 then automatically sets all the individual elements of the printing apparatus on the basis of the section of the original to be printed that has been defined by the user, and on the basis of the defined printing format or the defined enlargement. These include: determining the requisite length to which the printing material is to be cut or severed; the cutting or severing of a corresponding sheet by the cutting device 9; the positioning of the printing material in the exposure position, with the center of the sheet being located in the optical axis of the lens when the lens is in its normal position, on the paper stage 2 by the printing material positioning device 2a; the setting of the corresponding enlargement of the lens 5 by the lens focusing device 6; the correct positioning of the original F on the original stage by the original positioning device 3; and the correct positioning of the lens 5 crosswise to the original transport direction L by the lens positioning device 12. The last three operations will be described below in further detail in conjunction with FIGS. 2–5. The required length to which the printing material P is to be cut or severed is determined from the aspect ratio, length/width, of the section S to be printed from the original F multiplied by the width of the selected printing format. FIG. 2 illustrates the normal situation when the original F is in the normal printing position, with the center in the optical axis A of the lens 5 in the normal position of the lens, and is projected, filling the entire surface, onto a sheet of printing material P. In this normal setting, a section S of the original is projected onto a section SP of the printing material P.

Figure 4:
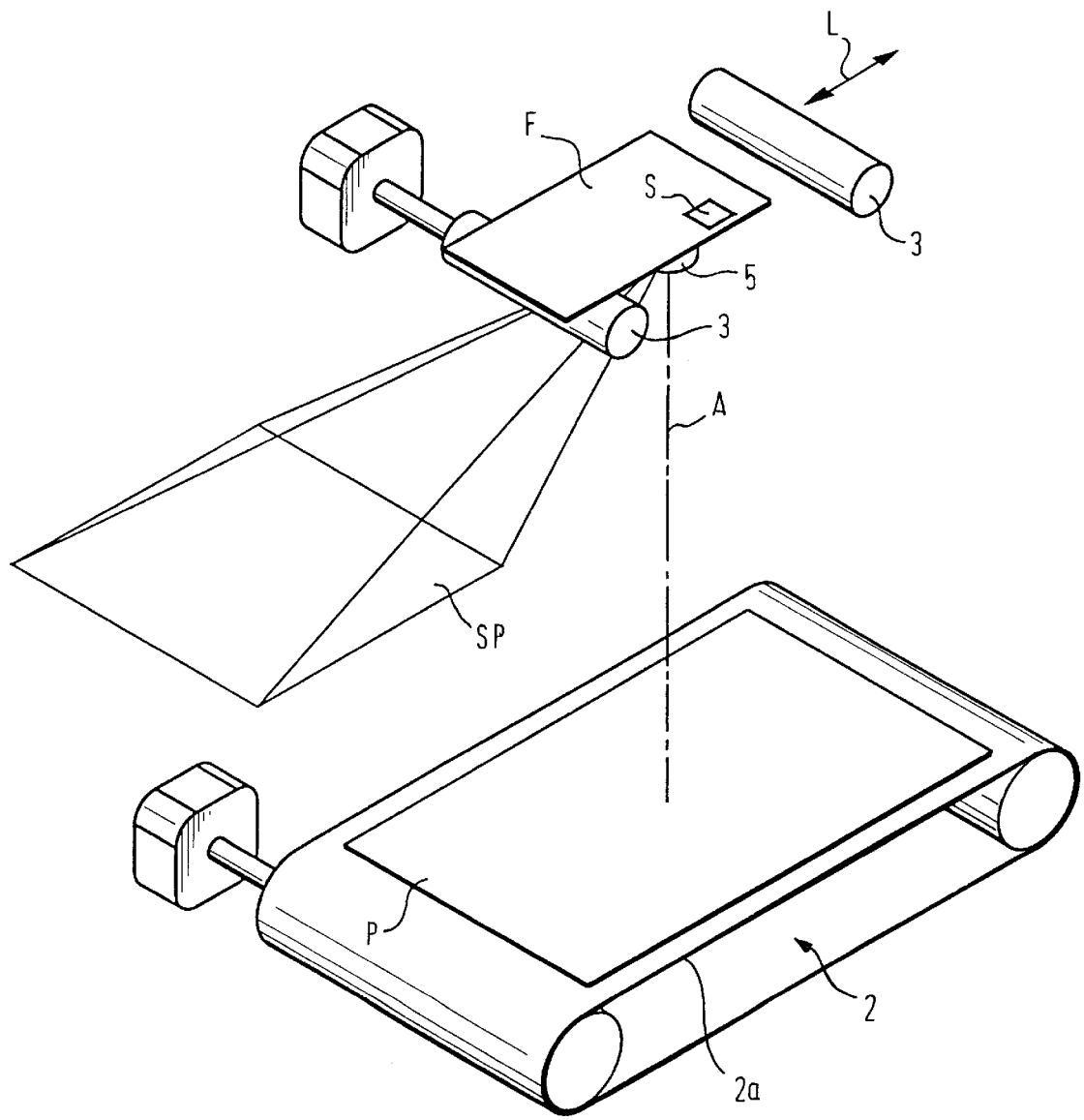
Figure 5:
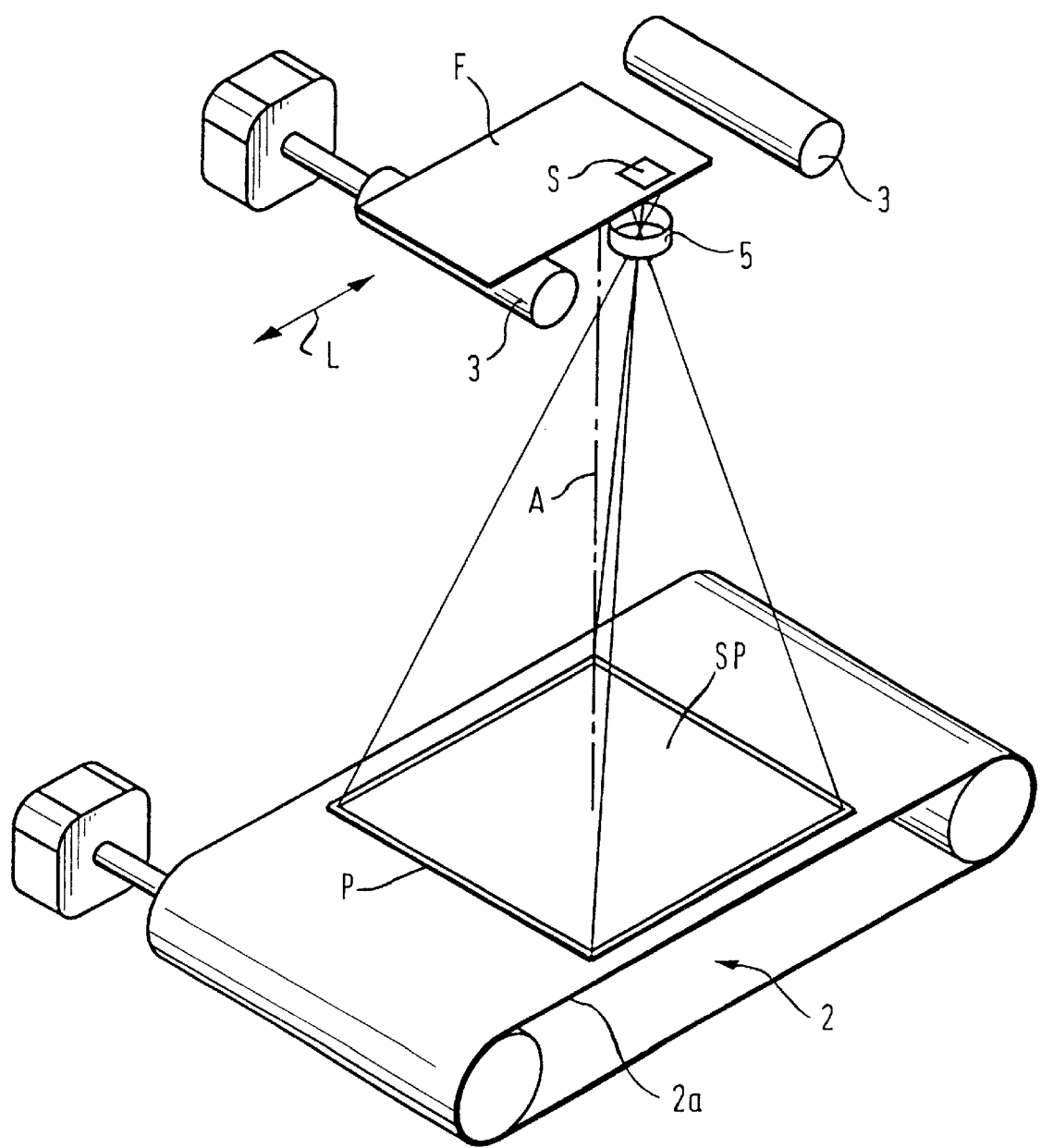

In order for this section S of the original F to be projected onto the sheet of printing material P, three settings must be made. First, referring to FIG. 3, the original F is adjusted out of the normal printing position by the longitudinal offset. This offset is the spacing, measured parallel to the transport direction, between the center of the section S and the center of the original, by the original positioning device, i.e., transport rollers 3, in or counter to the transport direction L (the longitudinal direction of the film strip), so that the center of the section S is now located in a plane extending through the optical axis A of the lens 5, at right angles to the transport direction L. In other words, the spacing measured parallel to the transport direction L between the center of the section and the optical axis A is zero, after this positioning of the original. Secondly, referring to FIG. 4, the enlargement of the lens 5 is set by the lens focusing device 6 in such a way that the projection SP of the section S to be printed is substantially equal in size to the sheet P of printing material. Finally, referring to FIG. 5, the lens 5 is also adjusted crosswise to the transport direction L by the lens positioning device 12 so that the projection SP of the section to be copied comes to be located not next to the printing material, as shown in FIG. 4, but rather precisely centrally on the sheet P of printing material. The comparatively short travel distance by which the lens 5 has to be adjusted crosswise depends on the selected enlargement and on the crosswise offset of the section, i.e., on the spacing, measured crosswise to the transport direction L, between the center of the section and the center of the entire original, and is obtained by the following formula:

travel distance=crosswise offset C enlargement/(enlargement+1).

The order of the three setting steps is arbitrary. It is to be understood that the positioning of the original F and of the lens 5 can also be performed directly, that is, without making the detour through the normal printing position or the normal position of the lens.

The control device 10 is embodied by a computer, or includes a computer that executes a program for performing the control functions. The control device 10 or its computer knows the physical parameters of the printing apparatus and takes them into account. These physical parameters include, in particular, the width of the currently used printing material P and the widths of the printing materials that can be used alternatively, the maximum length of a sheet P of printing material, which is defined by the dimensions of the paper stage 2, and the enlargement setting range (minimal-maximal) of the currently used projection lens 5, and any alternatively usable projection lenses that may be present. Furthermore, there is also a predefined list of all possible printing formats in the memory of the control device 10 or its computer. These formats include, for example, 4×4, 4×6, 6×4, 6×9, 8×12, and 12×18 inches. The program of the control device 10 is designed such that the user can only define section of the original and the enlargement that are within the range of the physical possibilities of the printing apparatus, as defined by the components used in the printing apparatus and the printing material used as well as the printing formats contemplated. Preferably, the selection options are displayed on the screen 13 by control areas SK, also known as "soft keys", which can be selected by means of a keyboard or preferably by means of a pointer device such as a trackball that is included in the input means 14. Selection options that cannot be accommodated under the given physical parameters are either not displayed or are deactivated and characterized accordingly, for example, by being shown in another color. The selection options can also be displayed in a way that is dynamically adapted as a function of user inputs. For example, if the user defines a section of a certain size, then for a given width of printing material, not all the enlargement settings or printing formats are possible. Therefore, their screen or display is suitably deactivated or suppressed. In addition to or as an alternative, the closest printing format can also be automatically selected and displayed.

For the visual definition of the desired section to be copied from the original, control areas SK may also be provided, which, when actuated, can vary the frame R accordingly. For example, the frame can be moved to the left, to the right, upward, downward, made larger or smaller. Alternatively, the frame R can be enlarged using a pointer device in a known manner. Preferably, the aspect ratio of the defined section is also checked. If the aspect ratio does not match the printing format selected by the user, then, a combination of printing format and aspect ratio that comes closest to the selection made by the user is automatically selected and displayed visually. The user can then either accept this combination or select a new setting. It is to be understood that some other reaction to an improper selection combinations may also be made, for example, by means of suitable instructions.

The requisite enlargement is based on the ratio of the dimensions of the defined original section to the dimensions of the defined printing format and is automatically ascertained from this ratio. Since only a limited number of standardized printing formats are normally available, the user is preferably offered, for selection, printing formats and not enlargement settings. Thus, the user defines the enlargement indirectly. The user can also be presented with an ability to select the enlargement in which case analogous plausibility checks would be made. Accordingly, the concept of "defining the enlargement" is understood to mean both the direct setting of the enlargement and the indirect definition via the selection of a printing format.

If the user defines a section enlargement that cannot be performed with the currently used components, such as printing material and projection lens, but is possible with alternatively available components of the printing apparatus, then a corresponding notice is displayed that asks the user to change the applicable components. For example, this could be to choose a different width of printing material and/or a different projection lens. If, as described in the exemplary embodiment, the printing apparatus is equipped with a lens changing device (lens turret 12), then the lens can be changed automatically.

The above-described exemplary embodiment of the printing apparatus according to the invention allows enlargements of rectangular sections only when the sides of the sections are parallel to the edges of the original. In order to also enable printing of rectangular sections that are rotated relative to the edges of the original, the original and the printing material must be disposed so as to be rotatable relative to one another. In accordance with FIG. 1, for instance, this can be achieved by providing that the entire paper stage 2 is mounted on a turntable 20, which can be rotated in a defined manner by the desired angle via a drive motor 21. In that case, the control device 10 would be embodied so that a rotation of the frame R could also be enabled by the user and displayed on the screen 13 of the control device so that the rotation defined by the user can be converted into a corresponding rotation of the paper stage 2. As an alternative, the original stage 1 could also be rotated.

For the crosswise adjustment of the projection lens 15 crosswise to the transport direction L of the original F, the original could be mounted on a motor-driven slide. Preferably, in accordance with another aspect of the invention, the lens turret 12 is used for this purpose. However, it is especially embodied for this purpose and is described in further detail below in conjunction with FIG. 6.

Figure 6:
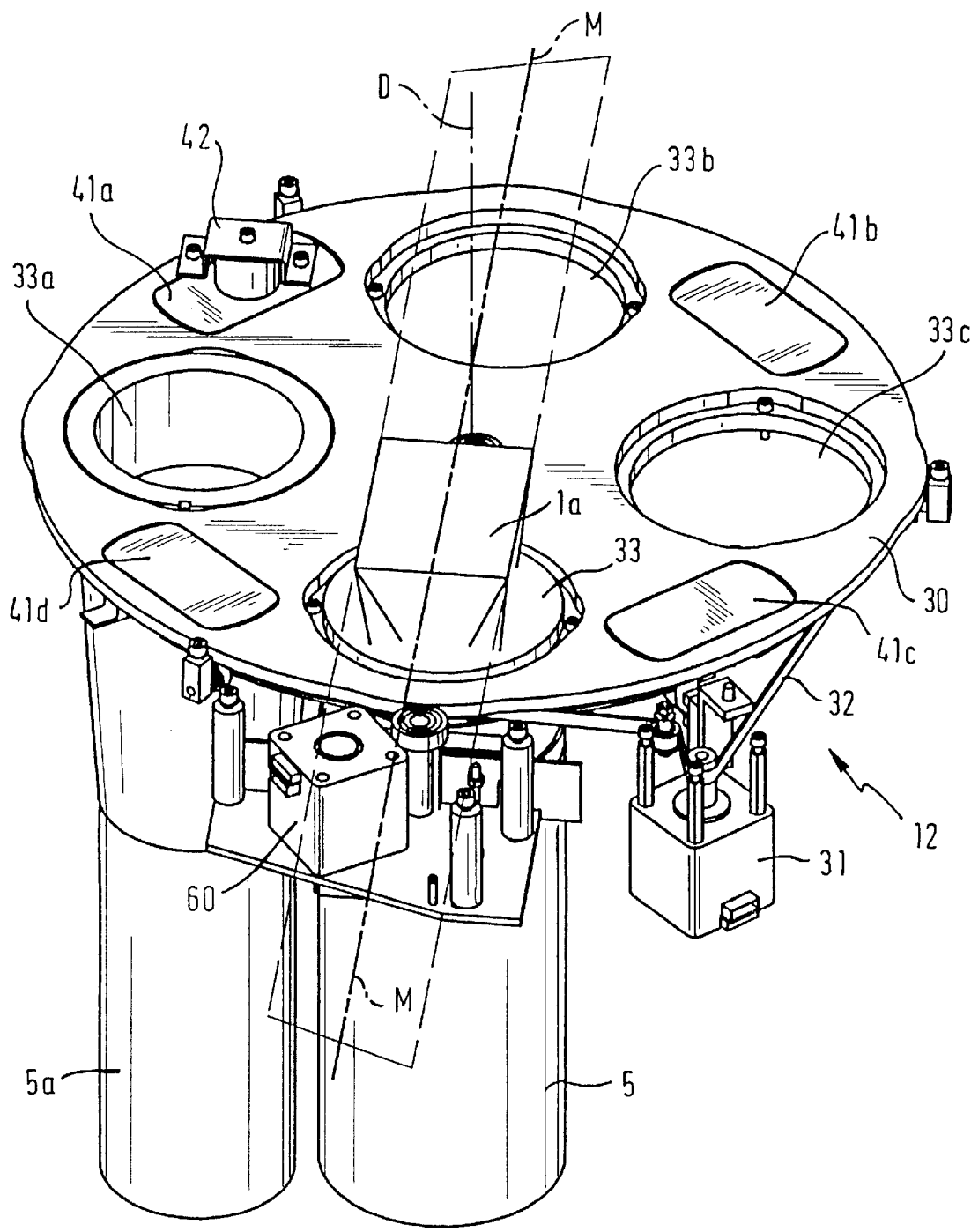
FIG. 6 illustrates a lens turret.

The lens turret, generally identified by reference numeral 12, includes a turntable 30, which is supported in the printing apparatus and is driven to rotate by means of a stationary drive motor 31 which cooperates with the control device 10, via a belt 32 about a pivot axis D that is perpendicular to the original stage 1 and the paper stage 2. The disposition of the turntable 30 in the printing apparatus is such that the pivot axis D passes through a center line M, which is defined by the motion of the center of the original F as it is transported into the printing window 1a. The turntable 30 has four receiving openings 33, 33a, 33b, 33c, one for each projection lens. In FIG. 6, only two lenses 5 and 5a are illustrated. The four lenses are mounted such that their optical axes extend parallel to the pivot axis D of the turntable 30. By rotating the turntable 30, the receiving openings 33, 33a, 33b and 33c can be moved selectively beneath the printing window 1a and the lenses can thus be introduced selectively into the printing beam path. In the region of the printing window 1a, there is also a drive motor 60, which cooperates with the control device 10 and is in engagement at a given time with the particular lens that is in the working position, i.e., below the printing window. This drive motor is used to adjust the enlargement of the lens. The lens turret is known and requires no further description.

In conventional lens turrets of this type, each of the lenses can only be placed in a precisely defined working position in which the optical axis of that particular lens extends through the center of the printing window, i.e., the normal position of the lens. The turntable 30 can be locked only in a number of precisely defined rotary positions that correspond to the number of lenses provided. Mechanical or electrical detent means are typically provided for this purpose. In accordance with the above description, however, the projection lens active at the time must be adjustable crosswise within certain limits. In order to facilitate this adjustment, the lens turret 12 has no locking means and instead is provided with a substantially continuously operating mechanical or electromagnetic braking device which permits locking of the turntable 30, and thus, of the lenses, in an arbitrary rotary position, in each case within a sufficiently wide range about the normal position. The braking device is preferably embodied by platelike magnetic pills 41a, 41b, 41c and 41d, integrated with the turntable 30, and by a stationary electromagnet 42 cooperating with the magnetic pills. The magnet is triggered by the control device 10. The coupling between the drive motor 60 for setting the enlargement of the lens in the working position is also designed mechanically such that the drive motor 60 and the adjusting devices on the lens itself remain in engagement over the entire range by which the lens has to be adjusted crosswise. This coupling can be achieved by a suitably disposed toothed belt.

Because of the specialized disposition of the pivot axis D of the turntable 30, the lens, in the region of the printing window 1a, moves approximately linearly and at right angles to the transport direction L of the original. The crosswise adjustment of the active lens at the time, required for producing enlargements of sections, can be accomplished by a suitable rotary motion of the turntable 30, tripped by the control device 10. In printing apparatuses that are already equipped with a lens turret, the projection lens can be adjusted crosswise without a major added expense for construction. The virtual linearity of the motion of the lens is generally sufficient in practice. If increased precision is required, the slight positioning error caused by the arclike motion of the lens can be compensated for by a corresponding adjustment of the original effected by the control device 10. This is logically also applicable to the case where the lens turret cannot be disposed in the printing apparatus in such a way that the projection lens moves symmetrically and substantially perpendicularly to the transport direction L when in the region of the printing window. This situation occurs whenever the pivot axis D of the lens turret is not located at or quite near the center line M of the transport path of the original F.

The printing apparatus of the invention can also be designed to process endless printing material instead of single sheets. In that case, the cutting device 9 is omitted. Instead, the paper stage 2 is provided with an adjustable mask whose size (length) is set to the currently defined printing format by the control device 10.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. An apparatus for producing two dimensional photographic prints from an original onto a photographic printing material comprising:

an original positioning device for transporting the original to and positioning it in a printing position;

a printing material positioning device for transporting the photographic printing material to and positioning it in an exposure position;

a lighting device for exposing the original, located in the printing position, to a print light;

an adjustable lens for projecting the original, located in the printing position, onto the printing material located in the exposure position with a variable enlargement;

a lens focusing device for setting the enlargement of the lens;

a lens positioning device for positioning the lens such that at least a section of the original is projected onto the printing material; and a first control device for controlling the original positioning device, the printing material positioning device, the lens focusing device and the lens positioning device, wherein a non-central section of the original is projected centrally onto the printing material by a displacement of the lens by the lens positioning device, said displacement of the lens being crosswise to a transport direction of the original from a position where an optical axis of the lens passes through the center of the printing position combined with a displacement of a center of the original by the original positioning device from the center of the printing position in the transport direction of the original.

2. The apparatus of claim 1 wherein a rotating means rotates the original, located in the printing position, and the printing material, located in the exposure position, relative to one another.

3. The apparatus of claim 1, wherein said lens positioning device comprises a lens turret for said crosswise displacement of said lens, said lens turret comprising at least a second lens, alternatively positioned for projecting the original onto the printing material, wherein one of said adjustable lens and the at least second lens is selected for projecting said section centrally onto the printing material.

4. The apparatus of claim 1 further comprising a second control device, cooperating with said first control device, for enabling the definition of a section of the original and a desired enlargement of the section that is to be printed wherein the first control device also controls the lens positioning device in addition to controlling the original positioning device and the lens focusing device on the basis of the defined enlargement and section information.

5. The apparatus of claim 4 wherein the second control device comprises:

an input means for manually defining the section of the original that is to be copied and the desired enlargement of the original;

a screen for displaying the original; and a means for making the defined section visible on the screen.

6. The apparatus of claim 5 wherein the second control device enables the definition of a plurality of combinations of sections and enlargements wherein said sections and enlargements are located within the limits set by the lens used and by the dimensions of the printing material used.

7. The apparatus of claim 3, wherein different enlargement ranges are provided by the lenses of the lens turret.

8. The apparatus of claim 7 wherein the first control device automatically controls the selective introduction of the lenses of the lens turret into a printing beam path on the basis of the enlargement and the section of the original that are defined by the second control device.

9. The apparatus of claim 3 wherein the lens turret is locked in one of a plurality of arbitrary rotary positions.

10. The apparatus of claim 9 wherein the lens turret is equipped with at least one of a mechanical and a magnetic braking device for locking the turret into a desired one of the plurality of rotary positions.

11. The apparatus of claim 3, wherein the original is transported along a transport direction when it is transported in the exposure position and wherein, when said crosswise displacement of said selected lens takes place by means of said turret, the first control device compensates for an arclike motion of the selected lenses by a corresponding compensatory motion of the original in at least one of the transport direction and counter to the transport direction such that the defined section is printed centrally on the photographic printing material.

12. The apparatus of claim 4 further comprising a cutting device cooperating with the first control device for severing individual sheets of printing material from a supply roll wherein the first control device determines the length of the sheets to be cut off on the basis of the enlargement and the section of the original that are defined by the second control device.

13. The apparatus of claim 3, wherein a pivot axis of said turret is perpendicular to the original and the printing material and passes through a line which defined by a motion of the center of the original when it is transported in the exposure position.

* * * * *